US008358640B1

(12) United States Patent
Breau et al.

(10) Patent No.: US 8,358,640 B1
(45) Date of Patent: Jan. 22, 2013

(54) FEMTOCELL BRIDGING IN MEDIA LOCAL AREA NETWORKS

(75) Inventors: Jeremey R. Breau, Leawood, KS (US); Jason R. Delker, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 248 days.

(21) Appl. No.: 12/791,859

(22) Filed: Jun. 1, 2010

(51) Int. Cl.
*H04L 12/56* (2006.01)
*H04J 1/16* (2006.01)

(52) U.S. Cl. ........ 370/338; 370/252; 370/329; 370/342; 370/442; 370/466

(58) Field of Classification Search .................. 370/252, 370/329, 466, 442, 338, 342
See application file for complete search history.

(56) References Cited

U.S. PATENT DOCUMENTS

| | | | |
|---|---|---|---|
| 6,701,527 B2 | 3/2004 | Schein et al. | |
| 7,929,538 B2 | 4/2011 | Gobara et al. | |
| 8,254,305 B1 | 8/2012 | Breau et al. | |
| 2004/0117831 A1 | 6/2004 | Ellis et al. | |
| 2005/0097595 A1 | 5/2005 | Lipsanen et al. | |
| 2006/0245403 A1 | 11/2006 | Kumar | |
| 2007/0211734 A1 | 9/2007 | Yang et al. | |
| 2008/0126550 A1 | 5/2008 | Yasuma | |
| 2008/0235358 A1 | 9/2008 | Moribe et al. | |
| 2009/0210908 A1 | 8/2009 | Sammarco | |
| 2010/0162321 A1 | 6/2010 | Bradley | |
| 2010/0211665 A1 | 8/2010 | Raza et al. | |
| 2010/0322213 A1* | 12/2010 | Liu et al. ........................ 370/338 |
| 2011/0179184 A1 | 7/2011 | Breau et al. | |
| 2011/0270680 A1* | 11/2011 | Lim .......................... 705/14.58 |

OTHER PUBLICATIONS

Notice of Allowance dated Apr. 11, 2011, U.S. Appl. No. 12/689,081, filed Jan. 18, 2012.
Breau, Jeremy R., et al., Patent Application entitled "System and Method for Bridging Media Local Area Networks," filed Jan. 18, 2010, U.S. Appl. No. 12/689,081.
"Address Resolution Protocol," Wikipedia, http://en.wikipedia.org/w/index.php?title=Address_Resolution_Protocol&printable=yes, (last visited Aug. 25, 2009).
Bahlmann, Bruce, "DLNA Basics, Bridging Services within a Connected Home," Communications Technology, http://www.cable360.net/print/ct/deployment/techtrends/23787.html, Jun. 1, 2007.
Bahlmann, Bruce, "Digital Living Network Alliance (DLNA) Essentials," Birds-Eye.Net, http://www.birds-eye.net/article_archive/digital_living_network_alliance_dlna_essentials.htm, Apr. 1, 2007.
"Network address translation," Wikipedia, http://en.wikipedia.org/w/index.php?title=Network_address_translation&printable=yes, Aug. 20, 2009.
Pre-Interview Communication dated Jul. 31, 2012, U.S. Appl. No. 12/698,495, filed Feb. 2, 2010.
Delker, Jason R., et al., Patent Application entitled "Centralized Program Guide," filed Feb. 2, 2010, U.S. Appl. No. 12/698,495.

*Primary Examiner* — John Pezzlo

(57) ABSTRACT

A femtocell is provided. The femtocell comprises a processor, a memory, and a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE). The femtocell also comprises an application stored in the memory that, when executed by the processor, receives simple service discovery protocol messages from a media local area network identifying content stored in the media local area network and provides information about the content to the mobile communication device.

16 Claims, 4 Drawing Sheets

FEMTOCELL BRIDGING IN MEDIA LOCAL AREA NETWORKS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Femtocells are small devices used to improve mobile network coverage in small areas, for example in home offices and small offices. A femtocell allows service providers to extend service coverage indoors, especially where access would otherwise be limited or unavailable due to attenuation of radio wave propagation. In congested structures and buildings such as hospitals and in physical spaces obstructed by concrete or steel enclosures such as basements, femtocells may receive signals from proximate mobile communication devices and forward them on to a communications network. A femtocell typically may provide extra coverage in a range of about 100 feet for residential femtocells. Femtocells communicate with a mobile network service provider's network using broadband connections. A femtocell typically may be the size of a residential gateway or smaller and may also be integrated into larger devices. Mobile communication devices typically require no modification to use femtocells. By strategically placing femtocells, a mobile network provider may improve both coverage and capacity. Improving service may reduce customer fallout or churn and may present opportunities for new services and reduced cost for the provider. The provider may reduce both capital expenditure and operating costs.

SUMMARY

In an embodiment, a femtocell is provided. The femtocell comprises a processor, a memory, and a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE). The femtocell also comprises an application stored in the memory that, when executed by the processor, receives simple service discovery protocol messages from a media local area network identifying content stored in the media local area network and provides information about the content to the mobile communication device.

In an embodiment, a femtocell is provided. The femtocell comprises a processor, a memory, and a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE). The femtocell also comprises an application stored in the memory that, when executed by the processor, receives a message from the mobile communication device identifying content stored in the mobile communication device, stores an entry in the memory identifying the content and a reference for accessing the content, and multicasts a message identifying the content to a media local area network.

In an embodiment, a femtocell is provided. The femtocell comprises a processor, a memory, and a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE). The femtocell also comprises an application stored in the memory that, when executed by the processor, receives a first hypertext transport protocol (HTTP) message from the mobile communication device via the radio transceiver, transmits a second hypertext transport protocol message to the mobile communication device via the radio transceiver requesting the mobile communication device to request a web connection to one of a media local area network and the Internet.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
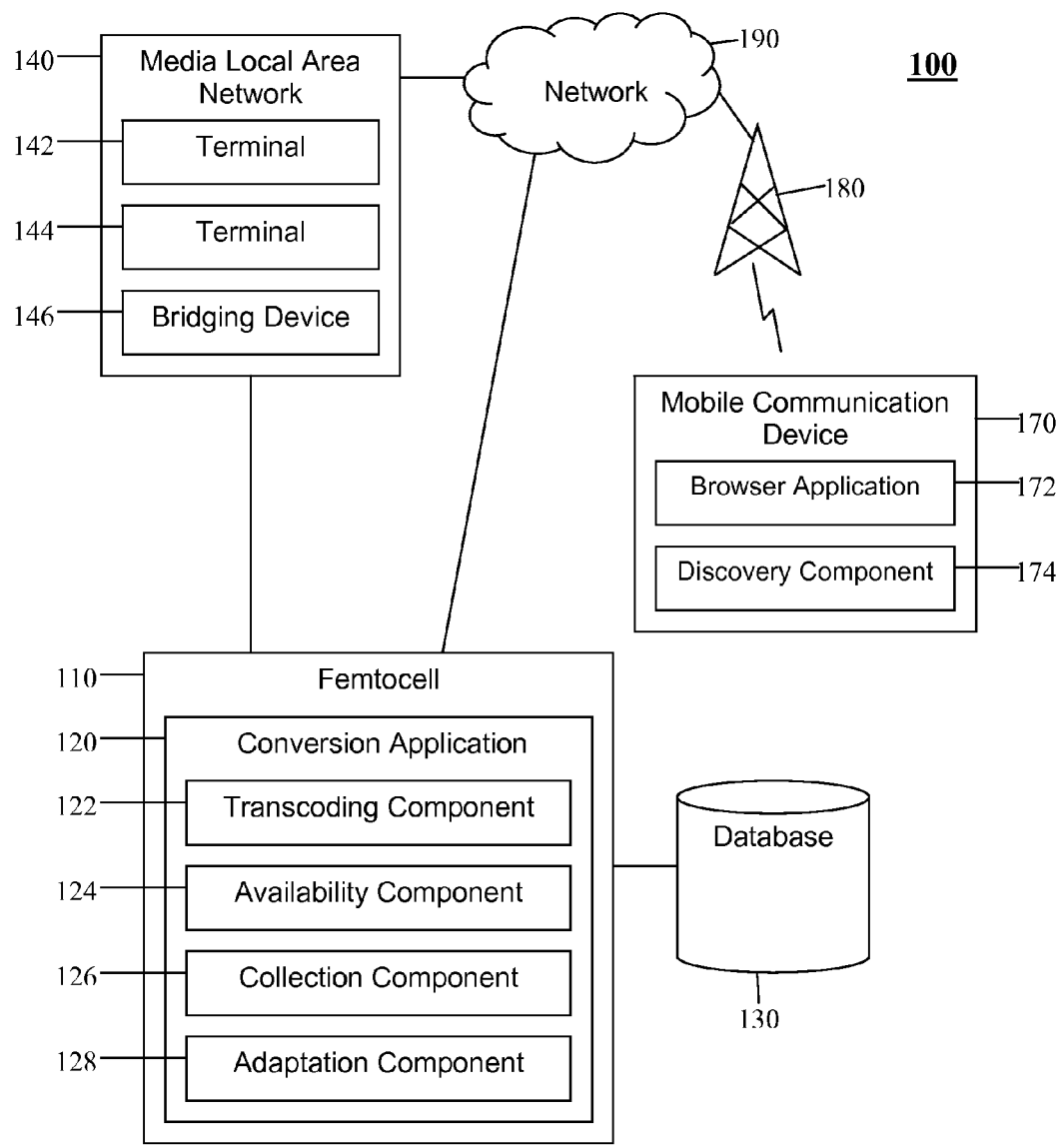
FIG. 1 is a block diagram of a system according to an embodiment of the disclosure.
Figure 1:
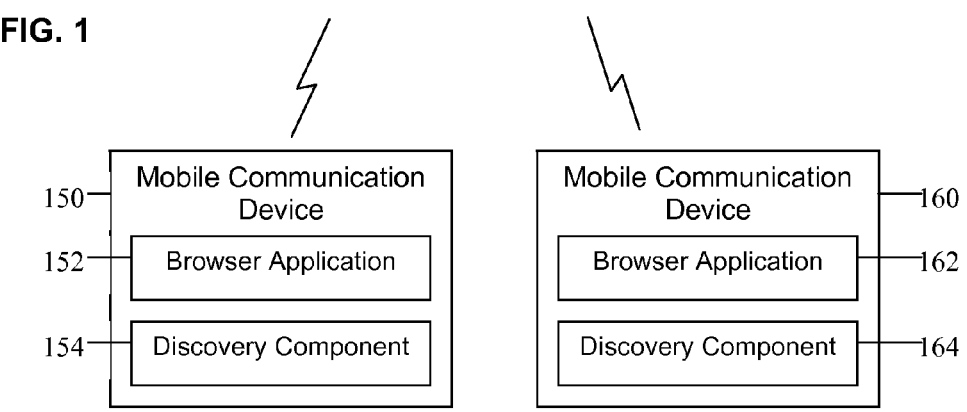

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

The present disclosure teaches a system of femtocell bridging in media local area networks that promotes a femtocell providing a gateway for a mobile communication device to access a media local area network. The femtocell provides the mobile device access to content stored in a plurality of devices in the media local area network. The femtocell conversely allows the devices on the media local area network access to content made available by the mobile communication device. A femtocell with an evolution-data optimized (EV-DO) or other broadband wireless connection to a mobile communication device, for example a mobile telephone, also may be a station on a media local area network. Devices on the media local area network may exchange content in multicast transmissions using the simple service discovery protocol. The media local area network and its devices may observe the digital living network alliance (DLNA) standard that may describe how entertainment and other devices within a home or a small office share content with each other. Some mobile communication devices may not be compliant with the digital living network alliance standard and therefore may be unable to communicate and exchange content with devices on the media local area network. The present disclosure teaches the femtocell providing bridging, format conversion, and content gathering, assembly, and brokerage services for the mobile device and devices on the media local area network to exchange playable content.

The femtocell, that may provide traditional cellular voice and data connection to a wireless communications network, acts as a bridge between the mobile communication device and devices located on the media local area network. The present disclosure teaches components executing on the femtocell recognizing material both resident on the mobile device and accessible by the mobile device that may be converted to formats playable by devices on the media local area network. The femtocell draws or receives the material from the mobile device, transcodes the material to formats playable on the media local area network, and may announce the availability of the material to devices on the media local area network. The femtocell may immediately stream the material in multicast transmissions to the devices using the simple service discovery protocol that may be the standard protocol for media local area networks. The femtocell, as a participating device on the media local area network, may also receive a plurality of multicast transmissions from other devices on the media local area network. The femtocell may transcode the material to a format playable by the mobile communication device and may announce the availability of the material to the mobile device. The user of the mobile device may choose to view the material immediately, may download and store the material for later viewing, or may instruct the femtocell to store the material locally or remotely for future downloading and viewing on the mobile device. The present disclosure teaches the femtocell providing transcoding and content sharing in both directions between devices on the media local area network and mobile communication devices.

The femtocell as taught herein may provide cataloguing, presentation, and brokering services for content that may pass between devices on the media local area network and the mobile device. The femtocell may allow the mobile device to view and select content available in the media local area network using a browser application executing on the mobile device. The femtocell may conversely present content available from the mobile device in a manner that devices on the media local area network equipped with browser or other software may view and select the content. The femtocell may receive information from a user agent associated with the browser executing on the mobile device and may perform content adaptation and conversion services with regard to the screen resolution, processing power, and native language of the mobile device. Because some devices on the media local area network other than the femtocell may perform data packet encapsulation and forwarding services, devices on the media local area network may exchange messaging with external devices accessible via connections that use the internet protocol (IP), including the Internet, or other communication protocols. The mobile communication device, because it may exchange messaging and content with devices on the media local area network as taught by the present disclosure, may also gain access to the external devices via packet encapsulation across internet protocol networks.

The mobile communication device, in addition to communicating directly with the femtocell in a physically confined or short distance environment, may communicate with the femtocell through a wireless base transceiver station (BTS) or cell tower. For example, the mobile may transmit a voice or data signal over a wireless link to the base transceiver station; the base transceiver station may transmit the voice or data signal over a wired link to a network; and the network may transmit the voice or data signal over a wired link to the femtocell. The mobile communication device and the base transceiver station may communicate over a dedicated point-to-point wireless link.

The base transceiver station, in support of this point-to-point wireless link, may send power level command messages to the mobile communication device to adjust the radio transmission power level of the mobile communication device in order to conserve the reserve power of the mobile communication device, to avoid interference of the radio transmission of the mobile communication device with other mobile communication devices in the serving area of the base transceiver station or other serving areas of other base transceiver stations. The base transceiver station, in support of this point-to-point wireless link, may send modulation and coding commands to the mobile communication device to adapt the subject wireless link to changing channel conditions, for example to select a quadrature amplitude modulation (QAM) constellation of higher order or lower order, as needed. The base transceiver station, in support of this point-to-point wireless link, may manage handoff of the mobile communication device to another base transceiver station, as for example as the mobile communication device physically moves out of a coverage area of one base transceiver station into the coverage area of another base transceiver station.

The base transceiver station may allocate dedicated spectrum resources to the mobile communication device and other dedicated spectrum resources to other mobile communication devices, whereby a plurality of mobile communications devices are able to both transmit and receive communication traffic on their separate wireless links at the same time served by the same base transceiver station. Allocation of spectrum resources may entail allocating different frequency ranges to each mobile communication device. Alternatively, for example in a code division multiple access (CDMA) wireless technology based system, allocation of spectrum resources may entail allocating different pseudorandom codes to each mobile communication device, whereby multiple mobile communication devices share a single wireless spectrum range without interfering with each other using spread spectrum communication techniques well known to those skilled in the art.

These point-to-point methods of communication between the mobile communication device and the base transceiver station may contrast with communications that use Wi-Fi or other technologies that may be associated with a class of wireless local area network (WLAN) devices based on the Institute of Electrical and Electronics Engineers (IEEE) 802.11 set of standards. Devices using Wi-Fi and similar technologies may permit only one device at a time to transmit on a wireless local area network.

Turning now to FIG. 1, a system 100 of femtocell bridging in media local area network is provided. The system 100 comprises a femtocell 110, a conversion application 120, a database 130, a media local area network 140, terminals 142, 144, mobile communication devices 150, 160, 170, a base transceiver station (BTS) 180, and a network 190.

The femtocell 110 is a small base transceiver station that may be used in a home, small office, or other venue wherein a limited quantity of mobile communication devices 150, 160, 170 are served. The femtocell 110 is also associated with the media local area network 140 wherein a plurality of terminals 142, 144 are resident. The terminals 142, 144 store, exchange, and play a plurality of audio, video, and other electronic content within the media local area network 140. The terminals 142, 144 may exchange and send content for forwarding within and beyond the media local area network 140 in multicast transmissions using the simple service discovery protocol. A bridging device 146 resident within the media local area network 140 may facilitate forwarding of content to devices outside the media local area network 140. The media local area network 140 and its terminals 142, 144 may observe the digital living network alliance standard describing how devices within home networks and small office networks share their content with each other.

The conversion application 120 executes on the femtocell 110 and transcodes electronic content transmitted between the terminals 142, 144 located in the media local area network 140 and the mobile communication device 150. The femtocell 110 serves as a gateway and bridge to the mobile communication device 150 into the media local area network 140. The conversion application 120 allows the mobile communication device 150 to indirectly exchange content with the terminals 142, 144. The terminals 142, 144 may comprise a plurality of device types such as home entertainment devices and may store and play a plurality of electronic content types. The mobile communication device 150 may be a mobile telephone and may make contact with the femtocell 110 using evolution-data optimized or another broadband technology to receive access to a wireless voice and data communication network. The mobile communication device 150, 160, 170 may communicate directly with the femtocell 110, may communicate with the femtocell 110 through the base transceiver station 180, or may communicate with the femtocell 110 in another manner. In addition to the traditional femtocell function of wirelessly forwarding voice and data communication associated with a proximate mobile communication device 150, the present disclosure teaches the femtocell 110 providing the mobile communication device 150 access to the media local area network 140 and vice versa through the actions of the conversion application 120

Some mobile communication devices 150, 160, 170 may not be compliant with the digital living network alliance standard or other specification used by terminals 142, 144 on a media local area network 140 to exchange electronic content. Such mobile communication devices 150, 160, 170 may therefore be unable to receive and play content generated by terminals 142, 144. The terminals 142, 144 likewise may be unable to receive and play content made available by the mobile communication device 150. The present disclosure teaches the conversion application 120 providing the bridging, transcoding, and other services that promote the exchange of content between the terminals 142, 144 and the mobile communication device 150 that may not otherwise be possible.

The conversion application 120, in addition to providing a gateway for the mobile communication device 150 into the media local area network 140 and transcoding content passing between the mobile communication device 150 and terminals 142, 144, also provides server or information broker functions to the components. When the femtocell 110 and the mobile communication device 150 establish a data session using evolution-data optimized or another broadband standard, the femtocell 110 also may be receiving multicast transmissions of electronic content from terminals 142, 144. When the femtocell 110 is in communication with terminals 142, 144 and the mobile communication device 150, the conversion application 120 may announce to the terminals 142, 144 the availability of the content furnished by the mobile communication device 150. The mobile communication device 150, for example, may have locally stored or available from an external source a collection of entertaining or informative video clips that users of the terminals 142, 144 may find worth watching. The conversion application 120 also may announce to the mobile communication device 150 items of content that are presently available from terminals 142, 144 for consumption by the mobile communication device 150. One of the terminals 142, 144, for example, may be a film archive stored in a device on the media local area network 140. The conversion application 120 may announce to the mobile communication device 150 that the movies in the film archive are available for viewing.

The conversion application 120 does not place the terminals 142, 144 into direct communication with mobile communication devices 150, 160, 170 that may establish contact with the femtocell 110. The terminals 142, 144 and the mobile communication devices 150, 160, 170 do not have the means to communicate directly with each other or be configured to "know" of the each other's identity or even presence. It is the availability of the content provided by each that is announced, catalogued, and distributed by the conversion application 120. The terminals 142, 144 and mobile communication devices 150, 160, 170 and their users on opposite sides of the femtocell 110 may not be interested in the identities of each other as much as they are interested in the content that is made available by the participation of the other devices.

The present disclosure also teaches the conversion application 120 providing content server and broker functionality. The present disclosure teaches the conversion application 120 using the femtocell 110 as a web server to broker the search and discovery of electronic content in both directions between the terminals 142, 144 and the mobile communication devices 150, 160, 170. Depending on the type of devices they are and their technical capabilities, the terminals 142, 144 and the mobile communication devices 150, 160, 170 may be able to access and play a wide variety of electronic content. The terminals 142, 144 and the mobile communication devices 150, 160, 170 also may have technical and other limitations that prevent them from receiving, transmitting, storing, or playing some types of electronic content. The mobile communication devices 150, 160, 170 also may have profiles readable by the femtocell 110 that describe limitations on the types of content that may be provided to the mobile communication devices 150, 160, 170. The conversion application 120 in its capacity of content server and broker may track the capabilities and limitations of these devices as well as permissions and/or limitations described in profiles associated with the mobile communication devices 150, 160, 170. In announcing the presence of and in making available electronic content to these devices, the conversion application 120 may use its knowledge of these capabilities, limitations, and profile information to limit the electronic content these various devices may be made aware of and be allowed to access and view. The content cataloguing, serving, and brokering functions of the conversion application 120 supplement its transcoding functionality and promote the femtocell 110 serving as the gateway and bridge between the mobile communication device 150 accessing the media local area network 140 and the terminals 142, 144 drawing content from and sharing content with the mobile communication devices 150, 160, 170.

The conversion application 120 also may provide search functionality to accompany its content cataloguing and serving functionality. The user of the mobile communication device 150 may wish to browse through listings of content currently available on terminals 142, 144 in various manners. The user may wish to search through listings by content type, by subject titles, by date stored, or by playing length of titles. The user may wish to create listings by a plurality of these categories. The user of the mobile communication device 150, in configuring the search functionality, may wish to impose parental controls or other content controls for content accessed from terminals 142, 144 if an underage person may be using the mobile communication device 150. Searchability and visibility of content may be limited by profiles associated with mobile communication devices 150, 160, 170. The conversion application 120 also may allow users of some terminals 142, 144 to similarly search listings of content available on or otherwise accessible via the mobile communication device 150. Depending on the type of terminal 142 that may be used to search listings of content available from the mobile communication device 150, the conversion application 120 may permit the user of the terminal 142 to search some or all of the listings of available content.

When it presents descriptions of available content to the terminals 142, 144 and the mobile communication devices 150, 160, 170, the conversion application 120 may present a listing of the content titles and not include the source or origin of the content. Users of terminals 142, 144 and users of mobile communication devices 150, 160, 170 may be concerned primarily with the identity and availability of content. The origin and location of the content may be of little or no concern to the users.

The conversion application 120, in addition to transcoding electronic content and providing cataloguing, serving, brokering, and search services, also analyzes and adapts electronic content to be viewable and playable on the device playing the content. Terminals 142, 144 may comprise a plurality of device types with many technical characteristics. Mobile communication devices 150, 160, 170, that may be mobile telephones, may also exhibit broad variations in their technical characteristics and capabilities. The present disclosure also teaches the sharing of a wide variety of content types between terminals 142, 144 and mobile communication devices 150, 160, 170. Because of the many potential differences in technical attributes and capabilities of these sending and receiving devices and because of the many kinds of content that may be exchanged, the conversion application 120 features functionality permitting it to adapt technical aspects of content so the content may be played by the terminal 142 or mobile communication device 150. These adaptations may include adjusting the pixel rate, volume, resolution, color mix of content, or other technical setting to provide a better viewing or other playing experience for the user of the terminal 142 or mobile communication device 150. In an embodiment, the conversion application 120, instead of making technical adjustments to the electronic content being transmitted and played, may offer suggestions or set forth requirements to the terminal 142 or mobile communication device 150 regarding the making of changes to hardware and/or software settings before the content may be provided.

The femtocell 110 may be equipped with a radio transceiver to communicate with the mobile communication device 150 using a wireless cellular communication protocol and to communicate with the mobile communication devices 150, 160, 170 in data sessions using one of evolution-data optimized (EV-DO), one times radio transmission technology (1x-RTT), high-speed downlink packet access (HSDPA), worldwide interoperability for microwave access (WiMAX), code division multiple access (CDMA), global system for mobile communication (GSM), and long-term evolution (LTE). While the femtocell 110 is illustrated in FIG. 1 communicating with the media local area network 140 using a wired link, in an embodiment the femtocell 110 also may communicate with a wireless portion of the media local area network 140 using a wireless link. Alternatively, in another embodiment, the femtocell 110 may communicate with the media local area network 140 primarily using a wireless link.

The media local area network 140 comprises an association of terminals 142, 144 located in a home or small office that may exchange electronic content. Terminals 142, 144 may exchange content by multicast using the simple service discovery protocol. Traffic using the simple service discovery protocol may be transmitted using a specific multicast address, for example 239.255.255.250. The simple service discovery protocol may be used to transmit traffic between terminals 142, 144 within the media local area network 140. Such terminals 142, 144 and media local area network 140 may operate in compliance with the digital living network alliance (DLNA) standard used by manufacturers of consumer electronics to allow entertainment devices to share their content with each other across a home or small office network. For further details about media local area networks 140, bridging into media local area networks 140, and/or bridging between media local area networks 140, see U.S. patent application Ser. No. 12/689,121, filed Jan. 18, 2010, entitled "Integration of Remote Electronic Device with Media Local Area Network," by Jeremy R. Breau, et al., which is herein incorporated by reference. This application also includes subject matter related to U.S. patent application Ser. No. 12/689,081, filed Jan. 18, 2010, entitled "System and Method for Bridging Media Local Area Networks," by Jeremy R. Breau, et al., which is herein incorporated by reference.

Terminals 142, 144 may comprise a computer device type, a television device type, a media player device type, a gaming device type, a refrigerator device type, a range device type, an air handling device type, a dish washer device type, a clothes washing machine device type, a clothes dryer device type, and a freezer device type. The mobile communication device 150, 160, 170 may be a mobile phone, a personal digital assistant (PDA), a laptop computer, a notebook computer, and a media player.

The base transceiver station 180 may be any of a cellular wireless base transceiver station, for example a Code Division Multiple Access (CDMA), Global System for Mobile Communications (GSM), Universal Mobile Communications System (UMTS), and/or Long-term Evolution (LTE) cellular wireless base transceiver station; a World-wide Interoperable Microwave Access (WiMAX) base transceiver station; a WiFi access point; a femtocell; or other wireless access devices. While FIG. 1 depicts only one base transceiver station 180, in an embodiment a plurality of base transceiver stations 180 may be existent and in operation.

The network 190 promotes communication between the components of the system 100. The network 190 may be any communication network including a public data network (PDN), a public switched telephone network (PSTN), a private network, and/or a combination thereof.

The conversion application 120 comprises the transcoding component 122 that converts electronic content from a first format to a second format to permit a device to play the electronic content. The media local area network 140 may comprise many different kinds of terminals 142, 144, the terminals 142, 144 may originate and exchange many kinds of content, and a wide variety of different types of mobile communication devices 150, 160, 170 may make contact with the femtocell 110. Because of these many variations and the large number of combinations of these variables in various embodiments, the transcoding component 122 may convert many different kinds of source formats to other playing formats. For example, the terminal 142 may be a television featuring a high-definition video resolution referred to as 1080p. The mobile communication device 150 may be a mobile telephone featuring quarter video graphics array (QVGA) display resolution and the capacity to play video coded using the Motion Picture Experts Group-4 (MPEG-4) format. Whether electronic content is made available by the mobile communication device 150 and desired by the user of the terminal 142 or vice versa and whether the electronic content will therefore have to be converted from quarter video graphics array to 1080p or vice versa, the transcoding component 122 will activate to perform this conversion if such conversion is technically possible. The conversion application 120 may enable the femtocell 110 to function as a media extender to terminals 142, 144 in transcoding and serving content received from the mobile communication device 150 and in performing the same services for content transmitted in the opposite direction.

The transcoding component 122 may perform the content conversion on a streaming basis as the content is fed to it by the source or sending device. The transcoding component 122 may receive the content in progressive uploads, for example in content feeds received from the mobile communication device 150, and may after transcoding stream the content to the terminal 142. The transcoding component 122 also may buffer or cache some electronic content in either its source format or converted format. The femtocell 110 may be circuitry residing in a larger computer or device that may be associated with the database 130 wherein electronic content in its source and/or converted formats may be stored. Some items of electronic content may be popular and requested often in a plurality of formats. It may be advantageous for the conversion application 120 to maintain these items of electronic content in several formats and accessible in the database 130 or elsewhere.

The conversion application 120 also comprises the availability component 124 that assembles listings of electronic content available on terminals 142, 144 on the media local area network 140 that may be accessed by the mobile communication device 150. The availability component 124 also creates listings of electronic content for transmission in the reverse direction, i.e. for content made available by the mobile communication device 150 that may be consumed by terminals 142, 144.

When the availability component 124 is assembling listings or descriptions of content stored on or otherwise accessible from the terminals 142, 144 and available for viewing by the mobile communication device 150, the availability component 124 may present the content using the hypertext markup language (HTML) or the extensible markup language (XML). The mobile communication devices 150, 160, 170 may have browser applications 152, 162, 172 installed and executing, respectively, that allow users of the mobile communication devices 150, 160, 170 to browse through available content as presented by the availability component 124. The availability component 124 may use internal rules and other filtering methods or consult profiles associated with the mobile communication devices 150, 160, 170 when it may not be desirable for the mobile communication device 150 to be shown all content available on every terminal 142, 144.

The availability component 124 may permit the femtocell 110 to function in the capacity of a web server for the mobile communication devices 150, 160, 170 to search for, view listings of, and select content in the media local area network 140 for playing on the mobile communication device 150. The mobile communication devices 150, 160, 170 may have browser user agents that are components of their browser applications 152, 162, 172. When the mobile communication device 150 has established a wireless communications session with the femtocell 110 using evolution-data optimized (EV-DO) or other broadband technology, the mobile communication device 150 may then activate its browser application 152. The browser user agents of the browser applications 152, 162, 172 communicate to the availability component 124 information about the capabilities and requirements of the browser applications 152, 162, 172 and their hosting mobile communication devices 150, 160, 170, respectively. The conversion application 120 may redirect port 80 traffic related to hypertext transport protocol (HTTP) messaging from the mobile communication device 150 to a local gateway captive portal created on the femtocell 110. When the mobile communication device 150 establishes a hypertext transport protocol (HTTP) session with the femtocell 110 using its browser application 152, the femtocell 110 may ask the mobile communication device 150 if it wants to access its local network, i.e. the media local area network 140, or go directly to the Internet. The availability component 124 permits the mobile communication device 150 to be presented the electronic content available on the media local area network 140 in web server format. The availability component 124 provides a plurality of content search, discovery, and access services to the mobile communication device 150.

The present disclosure teaches the use of the femtocell 110 to broker the search and discovery of electronic content going in both directions between the mobile communication devices 150, 160, 170 and the terminals 142, 144 on the media local area network 140. The conversion application 120 creates a catalogue of content available to the mobile communication device 150 on the terminals 142, 144. The conversion application 120 conversely creates a catalogue of content available to the terminals 142, 144 from the mobile communication device 150.

The availability component 124 presents to the terminals 142, 144 listings of content available via the mobile communication device 150 that the terminals 142, 144 may access and consume. The content may be stored on the mobile communication device 150 or may be stored elsewhere and accessible by the mobile communication device 150 for streaming or other conveyance to the terminals 142, 144. The availability component 124 may identify electronic content associated with the mobile communication device 150 that may be converted to a format that is playable on the media local area network 140. The availability component 124 may consult with the transcoding component 122 to determine if an item of electronic content available from the mobile communication device 150 can be converted to a format that is playable on one or more terminals 142, 144. The availability component 124 presents listings of content available from the mobile communication device 150 that the terminal 142 may access and consume. The listings presented may be tags that are associated with the individual items of content on the mobile communication device 150 that the availability component 124 may use to obtain the content if the terminal 142 makes such a selection.

The mobile communication device 150 may respond through the availability component 124 to inquiries made by terminals 142, 144 about content the mobile communication device 150 may have available. When the mobile communication device 150 establishes contact with the femtocell 110 and the conversion application 120, the availability component 124 may announce to the terminals 142, 144 the new availability of content on the mobile communication device 150. The availability component 124 may do this without identifying the mobile communication device 150 and may instead just list the newly available content. The terminals 142, 144 may not have the technical sophistication to look for devices providing content and may only care about the availability of the content itself.

The conversion application 120 also comprises the collection component 126 that interacts with the mobile communication device 150 to discover electronic content that the mobile communication device 150 may have locally stored or may have access to elsewhere. The collection component 126 may send inquiries or otherwise induce the mobile communication device 150 to describe the electronic content that it has available. The collection component 126 may request content from the mobile communication device 150 on behalf of the terminal 142. The collection component 126 may send a message to the mobile communication device 150 requesting the content and the mobile communication device 150 may begin sending the content to the femtocell 110 in progressive uploads. The femtocell buffers, transcodes, and streams the content to the requesting terminal 142.

The mobile communication devices 150, 160, 170 may have installed and executing discovery components 154, 164, 174 respectively, that may be client components to the conversion application 120. The discovery components 154, 164, 174 may be configured to make periodic contact with the conversion application 120 to announce the content that is available to the mobile communication devices 150, 160, 170. The discovery components 154, 164, 174, either automatically or at the direction of the conversion application 120, may push all of the available content or only newly available content to the femtocell 110. The femtocell 110 may then store the content in the database 130 or elsewhere. Instead of pushing the content, the discovery components 154, 164, 174 may provide metatags to the conversion application 120 that it may use to construct its listings of available content for viewing by the terminals 142, 144. When a terminal 142 chooses an item of content, the collection component 126 may use the metatag associated with the item of content to obtain the content from the mobile communication device 150 or other designated device.

The discovery components 154, 164, 174 could be configured to automatically push new content or metatags associated with new content whenever their hosting mobile communication devices 150, 160, 170 establish new contact with the femtocell 110. The femtocell 110 may alternatively wait for mobile communication devices 150, 160, 170 installed with discovery components 154, 164, 174 to establish contact with the femtocell 110 and send messages to the discovery components 154, 164, 174 requesting the mobile communication devices 150, 160, 170 to either send or advertise available content. If a mobile communication device 150 comes into contact with the femtocell 110 and the femtocell 110 detects that the mobile communication device 150 does not have the discovery component 154 installed, the femtocell 110 may cause the mobile communication device 150 to install and activate the discovery component 154 and begin sending or advertising content. The discovery components 154, 164, 174 could be configured to immediately notify the femtocell 110 when their hosting mobile communication devices 150, 160, 170, respectively, gain access to new content.

The present disclosure teaches the conversion application 120 providing the services described herein to multiple mobile communication devices 150, 160, 170. The mobile communication devices 150, 160, 170 may be provided with profiles that the conversion application 120 may use to make decisions about what electronic media to send to each mobile communication device 150, 160, 170. In a family, for example, the mobile communication devices 150, 160, 170 used by the adults may have profiles that permit the exchange of a far broader amount of electronic content than the mobile communication devices 150, 160, 170 in the possession of the minors in the household. The conversion application 120 will determine what kinds of electronic content each mobile communication device 150, 160, 170 is permitted to exchange with the media local area network 140.

The conversion application 120 also comprises the adaptation component 128 that adapts content being transcoded and transmitted between the media local area network 140 and mobile communication devices 150, 160, 170 to permit the content to be played on the destination device. In addition to transcoding, the conversion application 120 may be required to adapt technical aspects of transcoded content to requirements or preferences of the device that will be playing the content, whether the playing device is a mobile communication device 150 or a terminal 142. When the mobile communication device 150 makes contact with the femtocell 110, after initial connectivity is established using evolution-data optimized or another technology, the mobile communication device 150 may then establish a browser session using the browser application 152. This may allow the mobile communication device 150 to access the web serving capability of the femtocell 110 provided by the availability component 124. The browser application 152 may include a user agent that describes technical aspects of the browser application 152 and the mobile communication device 150. The conversion application 120 uses this information in both providing transcoded content to the mobile communication device 150 and in taking possession of content from the mobile communication device 150 for transcoding and delivery to a requesting terminal 142. The user agent may comprise such information as the screen resolution, processing power, and language settings of the browser application 152.

The adaptation component 128 uses the information provided by the user agent and other information about the mobile communication device 150 as well as information about the terminal 142 in making adaptations to the electronic content that will allow the content to be played. The adaptation component 128 may work closely with the transcoding component 122 and the actions of the two components may take place concurrently and in an integrated manner to assure success in delivering properly transcoded and adapted content. While the transcoding component 122 may transform content from one format to another format so the content may be playable on the destination or viewing device, the adaptation component 128 may make adjustments to the content based on the entries in the user agent or other configuration file of the destination device to improve or optimize the presentation of the content.

Figure 2:
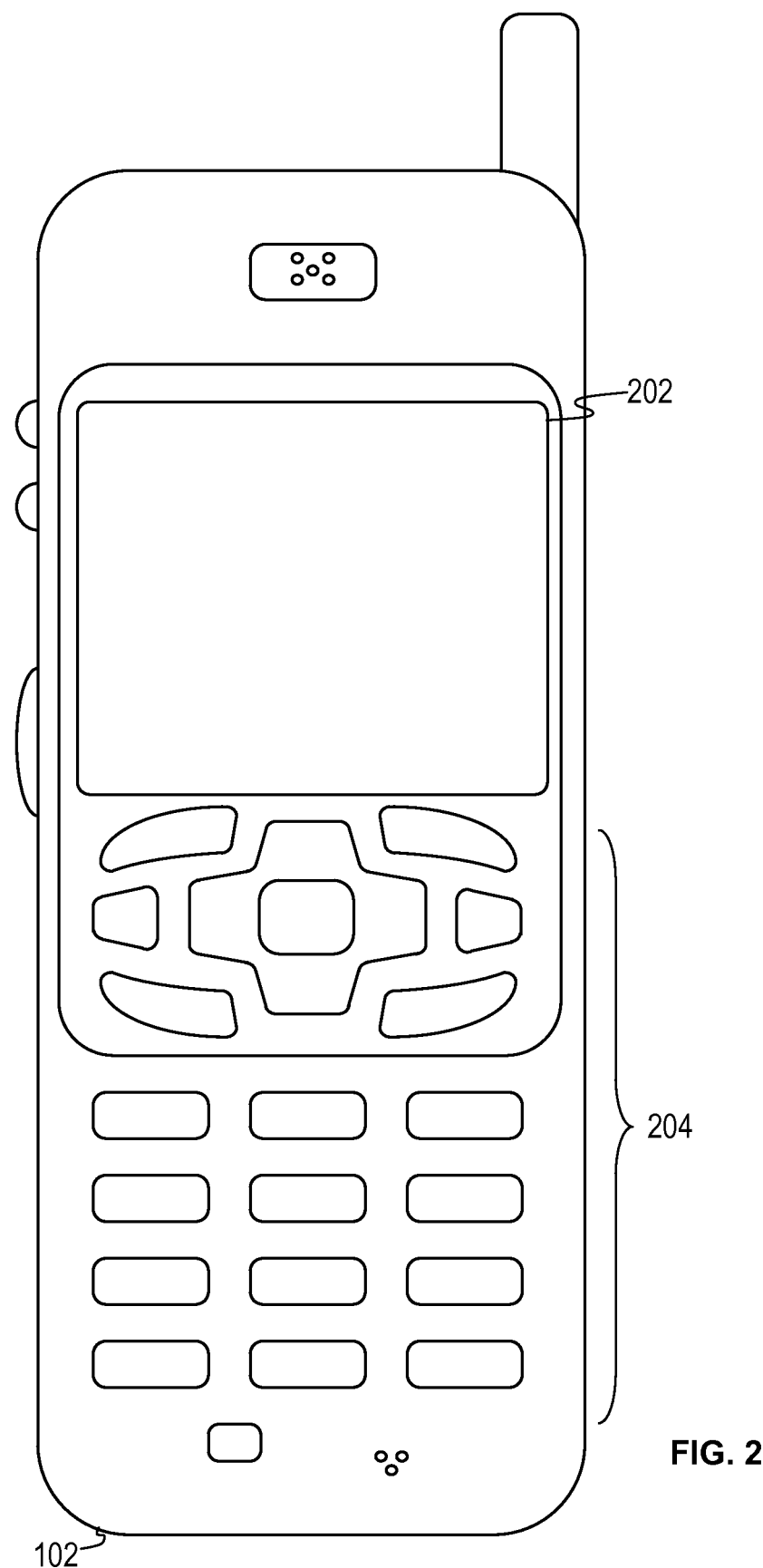
FIG. 2 is an illustration of a mobile device according to an embodiment of the disclosure.

FIG. 2 shows a wireless communications system including the mobile device 102. FIG. 2 depicts the mobile device 102, which is operable for implementing aspects of the present disclosure, but the present disclosure should not be limited to these implementations. The mobile device 102 may in some embodiments exemplify the mobile communication devices 150, 160, 170 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 202 and a touch-sensitive surface and/or keys 204 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base transceiver station, a wireless access point, or a peer mobile device 102.

Figure 3:
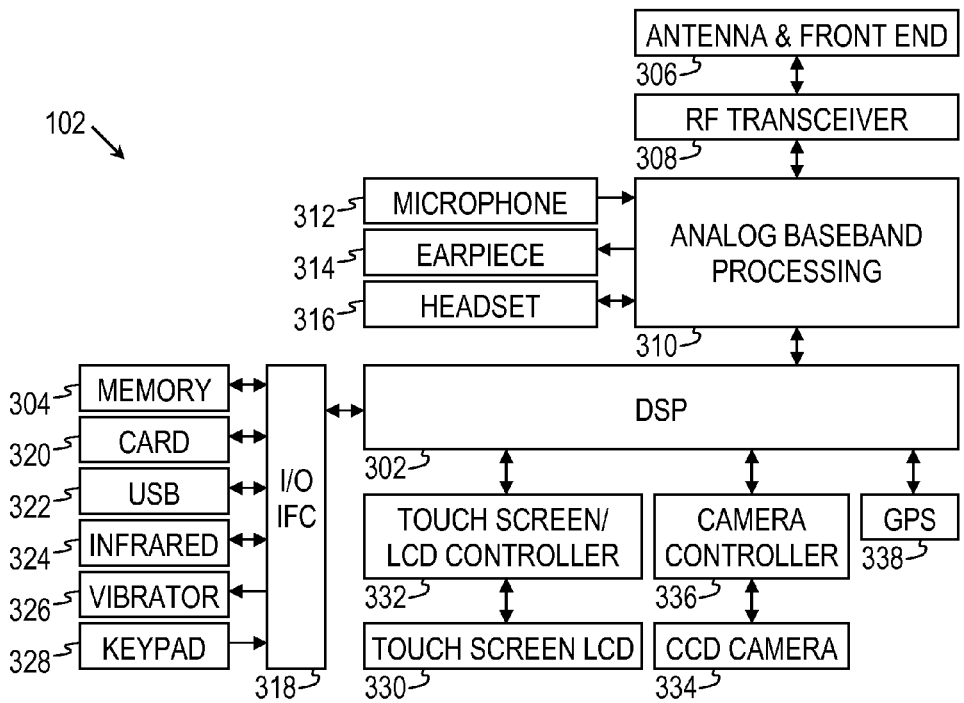
FIG. 3 is a block diagram of a mobile device according to an embodiment of the disclosure.

FIG. 3 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 302 and a memory 304. As shown, the mobile device 102 may further include an antenna and front end unit 306, a radio frequency (RF) transceiver 308, an analog baseband processing unit 310, a microphone 312, an earpiece speaker 314, a headset port 316, an input/output interface 318, a removable memory card 320, a universal serial bus (USB) port 322, an infrared port 324, a vibrator 326, a keypad 328, a touch screen liquid crystal display (LCD) with a touch sensitive surface 330, a touch screen/LCD controller 332, a charge-coupled device (CCD) camera 334, a camera controller 336, and a global positioning system (GPS) sensor 338. In an embodiment, the mobile device 102 may include another kind of display that does not provide a touch sensitive screen. In an embodiment, the DSP 302 may communicate directly with the memory 304 without passing through the input/output interface 318.

The DSP 302 or some other form of controller or central processing unit operates to control the various components of the mobile device 102 in accordance with embedded software or firmware stored in memory 304 or stored in memory contained within the DSP 302 itself. In addition to the embedded software or firmware, the DSP 302 may execute other applications stored in the memory 304 or made available via information carrier media such as portable data storage media like the removable memory card 320 or via wired or wireless network communications. The application software may comprise a compiled set of machine-readable instructions that configure the DSP 302 to provide the desired functionality, or the application software may be high-level software instructions to be processed by an interpreter or compiler to indirectly configure the DSP 302.

The antenna and front end unit 306 may be provided to convert between wireless signals and electrical signals, enabling the mobile device 102 to send and receive information from a radio access network (RAN) or some other available wireless communications network or from a peer mobile device 102. In an embodiment, the antenna and front end unit 306 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 306 may include antenna tuning and/or impedance matching components, RF power amplifiers, and/or low noise amplifiers.

The RF transceiver 308 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 310 and/or the DSP 302 or other central processing unit. In some embodiments, the RF transceiver 308, portions of the antenna and front end 306, and the analog baseband processing unit 310 may be combined in one or more processing units and/or application specific integrated circuits (ASICs).

The analog baseband processing unit 310 may provide various analog processing of inputs and outputs, for example analog processing of inputs from the microphone 312 and the headset port 316 and outputs to the earpiece speaker 314 and the headset port 316. To that end, the analog baseband processing unit 310 may have ports for connecting to the built-in microphone 312 and the earpiece speaker 314 that enable the mobile device 102 to be used as a mobile phone. The analog baseband processing unit 310 may further include a port for connecting to a headset or other hands-free microphone and speaker configuration. The analog baseband processing unit 310 may provide digital-to-analog conversion in one signal direction and analog-to-digital conversion in the opposing signal direction. In some embodiments, at least some of the functionality of the analog baseband processing unit 310 may be provided by digital processing components, for example by the DSP 302 or by other central processing units.

The DSP 302 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 302 may perform modulation, coding, interleaving, and spreading, and for a receiver function the DSP 302 may perform despreading, deinterleaving, decoding, and demodulation. In another embodiment, for example in an orthogonal frequency division multiplex access (OFDMA) technology application, for the transmitter function the DSP 302 may perform modulation, coding, interleaving, inverse fast Fourier transforming, and cyclic prefix appending, and for a receiver function the DSP 302 may perform cyclic prefix removal, fast Fourier transforming, deinterleaving, decoding, and demodulation.

In other wireless technology applications, yet other signal processing functions and combinations of signal processing functions may be performed by the DSP 302.

The DSP 302 may communicate with a wireless network via the analog baseband processing unit 310. In some embodiments, the communication may provide Internet connectivity, enabling a user to gain access to content on the Internet and to send and receive e-mail or text messages. The input/output interface 318 interconnects the DSP 302 and various memories and interfaces. The memory 304 and the removable memory card 320 may provide software and data to configure the operation of the DSP 302. Among the interfaces may be the USB port 322 and the infrared port 324. The USB port 322 may enable the mobile device 102 to function as a peripheral device to exchange information with a personal computer or other computer system. The infrared port 324 and other optional ports such as a Bluetooth interface or an IEEE 802.11 compliant wireless interface may enable the mobile device 102 to communicate wirelessly with other nearby handsets and/or wireless base transceiver stations.

The input/output interface 318 may further connect the DSP 302 to the vibrator 326 that, when triggered, causes the mobile device 102 to vibrate. The vibrator 326 may serve as a mechanism for silently alerting the user to any of various events such as an incoming call, a new text message, and an appointment reminder.

The keypad 328 couples to the DSP 302 via the interface 318 to provide one mechanism for the user to make selections, enter information, and otherwise provide input to the mobile device 102. Another input mechanism may be the touch screen LCD 330, which may also display text and/or graphics to the user. The touch screen LCD controller 332 couples the DSP 302 to the touch screen LCD 330.

The CCD camera 334 enables the mobile device 102 to take digital pictures. The DSP 302 communicates with the CCD camera 334 via the camera controller 336. The GPS sensor 338 is coupled to the DSP 302 to decode global positioning system signals, thereby enabling the mobile device 102 to determine its position. In another embodiment, a camera operating according to a technology other than charge coupled device cameras may be employed. Various other peripherals may also be included to provide additional functions, e.g., radio and television reception.

Figure 4:
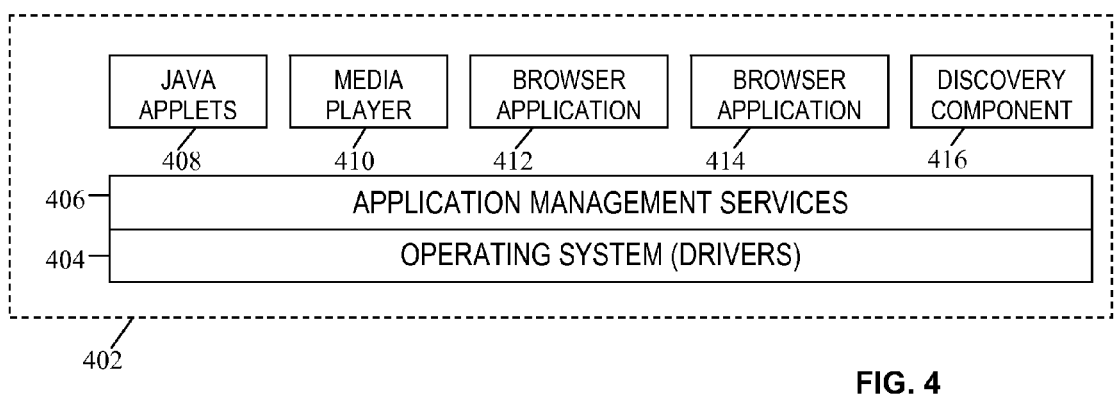
FIG. 4 is a block diagram of a software architecture for a mobile device according to an embodiment of the disclosure.

FIG. 4 illustrates a software environment 402 that may be implemented by the DSP 302. The DSP 302 executes operating system software 404 that provides a platform from which the rest of the software operates. The operating system software 404 may provide a variety of drivers for the handset hardware with standardized interfaces that are accessible to application software. The operating system software 404 may be coupled to and interact with application management services ("AMS") 406 that transfer control between applications running on the mobile device 102. Also shown in FIG. 4 are a web browser application 412, a media player application 410, and JAVA applets 408. The web browser application 412 configures the mobile device 102 to operate as a web browser, allowing a user to enter information into forms and select links to retrieve and view web pages. The media player application 410 configures the mobile device 102 to retrieve and play audio or audiovisual media. The JAVA applets 408 configure the mobile device 102 to provide games, utilities, and other functionality. The browser application 414 may provide the same or similar functionality as the browser application 152, 162, 172 provided by the system 100. The discovery component 416 may provide the same or similar functionality as the discovery components 154, 164, 174 provided by the system 100.

Figure 5:
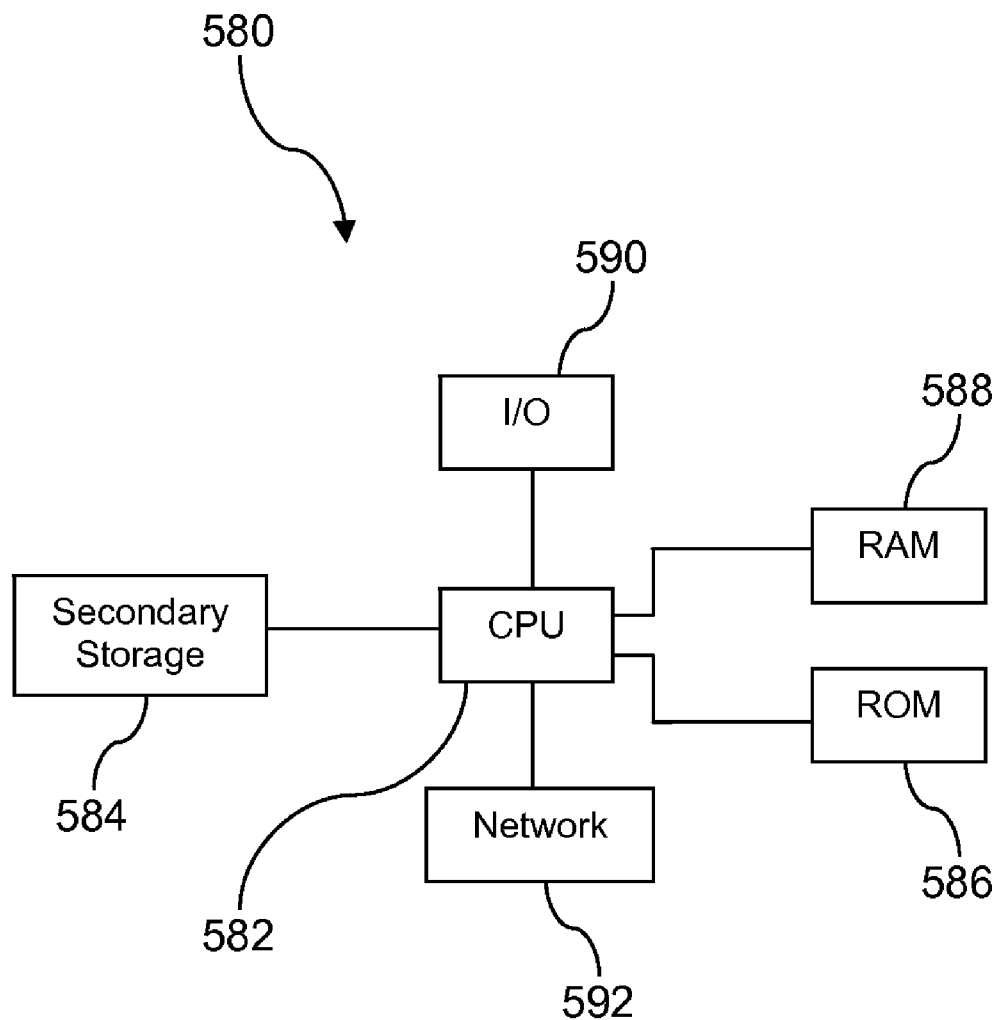
FIG. 5 illustrates an exemplary computer system suitable for implementing some aspects of the several embodiments of the disclosure.

FIG. 5 illustrates a computer system 580 suitable for implementing one or more embodiments disclosed herein. The computer system 580 includes a processor 582 (which may be referred to as a central processor unit or CPU) that is in communication with memory devices including secondary storage 584, read only memory (ROM) 586, random access memory (RAM) 588, input/output (I/O) devices 590, and network connectivity devices 592. The processor 582 may be implemented as one or more CPU chips.

It is understood that by programming and/or loading executable instructions onto the computer system 580, at least one of the CPU 582, the RAM 588, and the ROM 586 are changed, transforming the computer system 580 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage 584. The RAM 588 is used to store volatile data and perhaps to store instructions. Access to both ROM 586 and RAM 588 is typically faster than to secondary storage 584. The secondary storage 584, RAM 588, and ROM 586 may be referred to in some contexts as non-transitory storage or non-transitory computer readable media.

I/O devices 590 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 592 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 592 may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity devices 592 may propagate in or on the surface of electrical conductors, in coaxial cables, in waveguides, in an optical conduit, for example an optical fiber, or in the air or free space. The information contained in the baseband signal or signal embodied in the carrier wave may be ordered according to different sequences, as may be desirable for either processing or generating the information or transmitting or receiving the information. The baseband signal or signal embodied in the carrier wave, or other types of signals currently used or hereafter developed, may be generated according to several methods well known to one skilled in the art. The baseband signal and/or signal embodied in the carrier wave may be referred to in some contexts as a transitory signal.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592. While only one processor 582 is shown, multiple processors may be present. Thus, while instructions may be discussed as executed by a processor, the instructions may be executed simultaneously, serially, or otherwise executed by one or multiple processors. Instructions, codes, computer programs, scripts, and/or data which may be accessed from the hard drive, floppy disk, optical disk, ROM 586, and RAM 588 may be referred to in some contexts as non-transitory instructions or non-transitory information.

In an embodiment, the computer system 580 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 580 to provide the functionality of a number of servers that is not directly bound to the number of computers in the computer system 580. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 580, at least portions of the contents of the computer program product to the secondary storage 584, to the ROM 586, to the RAM 588, and/or to other non-volatile memory and volatile memory of the computer system 580. The processor 582 may process the executable instructions and/or data in part by directly accessing the computer program product, for example by reading from a CD-ROM disk inserted into a disk drive peripheral of the computer system 580. The computer program product may comprise instructions that promote the loading and/or copying of data, data structures, files, and/or executable instructions to the secondary storage 584, to the ROM 586, to the RAM 588, and/or to other non-volatile memory and volatile memory of the computer system 580

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A femtocell device, comprising:
   a processor;
   a memory;
   a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE); and an application stored in the memory that, when executed by the processor, receives simple service discovery protocol messages from a media local area network identifying content stored in the media local area network and provides information about the content to the mobile communication device, wherein the simple service discovery protocol messages received from the media local area network are originated by a plurality of devices on the media local area network, each of the plurality of devices on the media local area network is identified, and identification of each device comprises an indication of device type.

2. The femtocell device of claim 1, further including a transcoder to transform a content stored in the media local area network from a first format to a second format, wherein the mobile communication device is able to play back the content in the second format.

3. The femtocell device of claim 1, wherein the radio transceiver communicates with the mobile communication device using one of code division multiple access (CDMA), global system for mobile communication (GSM), long-term evolution (LTE), and worldwide interoperability for microwave access (WiMAX) wireless cellular communication protocol.

4. The femtocell device of claim 3, wherein the radio transceiver further communicates with a macrocell that provides access to a wireless cellular communication network.

5. The femtocell device of claim 1, wherein the mobile communication device is one of a mobile phone, a personal digital assistant (PDA), a laptop computer, a notebook computer, and a media player.

6. A femtocell device, comprising:
a processor;
a memory;
a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE);
an application stored in the memory that, when executed by the processor, receives a message from the mobile communication device identifying content stored in the mobile communication device, stores an entry in the memory identifying the content and a reference for accessing the content, and multicasts a message identifying the content to a media local area network; and
a transcoder to transform the content from a first format to a second format, wherein devices associated with the media local area network are able to play back content in the second format.

7. The femtocell device of claim 6, wherein the femtocell device at least one of locally and remotely stores content received from the mobile communication device.

8. The femtocell device of claim 6, wherein a client application executing on the mobile communication device provides information to the femtocell device about available content stored on the mobile communication device.

9. The femtocell device of claim 6, wherein content is transmitted from the mobile communication device to the femtocell device by the mobile communication device pushing the content to the femtocell device upon the content becoming available on the mobile communication device.

10. The femtocell device of claim 6, wherein content passes from the mobile communication device to the femtocell device by the femtocell device pulling selected content from the mobile communication device at the election of the femtocell device.

11. The femtocell device of claim 10, wherein the application pulls and buffers the content from the mobile communication device in progressive uploads and streams the transcoded content to the media local area network one of immediately and upon demand at a later time.

12. The femtocell device of claim 6, wherein the application multicasts the message identifying the content to the media local area network using the simple service discovery protocol.

13. A femtocell device, comprising:
a processor;
a memory;
a radio transceiver to communicate with a mobile communication device using a wireless cellular communication protocol and to communicate with the mobile communication device in a data session using one of evolution-data optimized (EV-DO), one times radio transmission technology (1x-RTT), high-speed downlink packet access (HSDPA), worldwide interoperability for microwave access (WiMAX), long-term evolution (LTE); and
an application stored in the memory that, when executed by the processor, receives a first hypertext transport protocol (HTTP) message from the mobile communication device via the radio transceiver, transmits a second hypertext transport protocol message to the mobile communication device via the radio transceiver requesting the mobile communication device to request a web connection to one of a media local area network and the Internet, wherein the femtocell device builds a catalogue of available content stored in devices on the media local area network for access by the mobile communication device.

14. The femtocell device of claim 13, wherein a web browser executing on the mobile communication device displays and promotes selection of content listed in the catalogue.

15. The femtocell device of claim 13, wherein the application adapts content stored in devices on the media local area network for at least one of the processing capability, display resolution attributes, and native language specifications of the mobile communication device.

16. The femtocell device of claim 13, wherein the femtocell device builds a catalogue of available content stored in the mobile communication device for access by devices on the media local area network.

* * * * *